Aug. 14, 1951  J. L. FORD ET AL  2,564,428
MULTIPLE, PARALLEL-CONNECTED METER MOUNTING
Filed Aug. 20, 1949
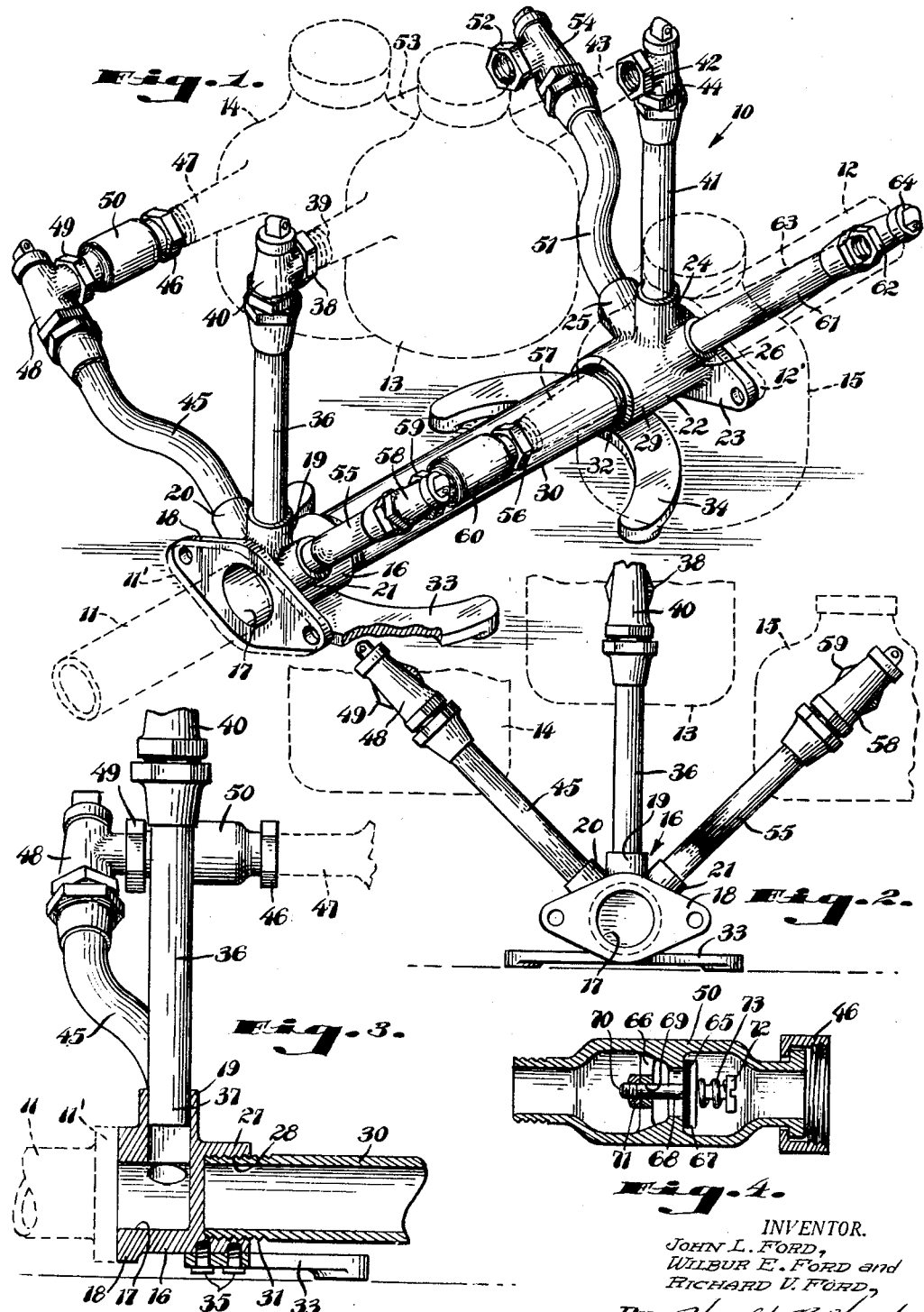
INVENTOR.
JOHN L. FORD,
WILBUR E. FORD and
RICHARD V. FORD,
By: Harold B. Hood
ATTORNEY.

Patented Aug. 14, 1951

2,564,428

UNITED STATES PATENT OFFICE 2,564,428

MULTIPLE, PARALLEL-CONNECTED METER MOUNTING

John L. Ford and Wilbur E. Ford, Wabash, Ind., and Richard V. Ford, Haddonfield, N. J., assignors to The Ford Meter Box Company, Inc., Wabash, Ind., a corporation of Indiana Application August 20, 1949, Serial No. 111,434

18 Claims. (Cl. 137—69)

The present invention relates to a multiple, parallel-connected meter mounting, and the primary object of the invention is to provide for an advantageous arrangement of fluid metering devices in a service line subject to wide variations of flow rates.

Fluid metering devices, and particularly water meters of standard construction, are quite accurate within a median range between minimum flow rate and maximum capacity flow rate; but that accuracy falls off slightly at the upper end, and sharply at the lower end, of the capacity range of the meter. Such meters are, of course, made in a variety of sizes, each size being well adapted to measure total volume of water passed, so long as the flow rate, during any period of operation, is within the median range of that meter. Perhaps the most popular meter size is designated as a one-inch meter, which is primarily intended for connection in a one-inch service line; and such a meter is capable of measuring, with satisfactory accuracy, water volumes passing the meter at very slow rates. In many industrial installations, and in some office buildings and apartment buildings, the water is metered as it enters the building, and two-inch supply lines are required for satisfactory service. Obviously, the maximum capacity of a one-inch meter is not sufficient to handle maximum flows of water supplied through a two-inch line; and it is customary to use a two-inch meter in such an installation. When, however, only one faucet in the entire building, for instance, is opened, the resultant flow rate through such a two-inch meter may frequently be below the range of reasonable accuracy, so that the meter may be actuated at a rate too slow to indicate the actual volume of water flowing therethrough, or may not be actuated at all.

It is an object of the present invention to provide a metering arrangement which, while offering a sufficient capacity to measure accurately maximum flow through a two-inch line, nevertheless will so accommodate itself to a low flow rate as to measure the volume of water passing the installation at a rate below the accurate range of a two-inch meter. A further object of the invention is to provide novel structure to facilitate the installation of such a metering arrangement, and to facilitate removal of one or more meters from such an arrangement, for servicing or replacement, without interrupting water service through the installation. Still further objects of the invention will appear as the description proceeds.

To the accomplishment of the above and related objects, our invention may be embodied in the form illustrated in the accompanying drawings, attention being called to the fact, however, that the drawings are illustrative only, and that change may be made in the specific construction illustrated and described, so long as the scope of the appended claims is not violated.

Fig. 1 is a perspective view of our meter mounting, meters being indicated, in dotted lines, in their intended installation relationship;

Fig. 2 is an end elevation looking from the left of Fig. 1;

Fig. 3 is a longitudinal section through one of the mounting fittings; and

Fig. 4 is an enlarged longitudinal section through one form of check valve means which may be used in our meter mounting.

It is known that the maximum capacity of three one-inch meters, connected in parallel, is substantially equivalent to the maximum capacity of a single two-inch meter. While it will be obvious that our invention is applicable to meters of any desired size, we have shown, and will describe in detail, a mounting particularly adapted for an installation comprising three one-inch meters. Obviously, by readily apparent structural modifications, more than three, or less than three, meters might be installed in parallel arrangement, and it is not inescapably essential that all of the meters in the installation shall be of the same size or type. Though only one physical embodiment of the invention has been illustrated and will be described herein, it is our intention to include such obvious structural modifications within the scope of the present disclosure and the claims appended hereto and forming a part hereof.

Our meter mounting, indicated generally by the reference numeral 10, is adapted to be connected between spaced, axially aligned sections 11 and 12 of a water supply line, or the like. Customarily, particularly in lines of two-inch diameter or larger, the facing ends of the sections 11 and 12 are provided with connector flanges 11' and 12', and we have so illustrated the present installation, though it will be obvious that any other suitable means for connecting the mounting into the line may be substituted. The mounting 10 is intended to support, and to provide communication through, three meters of conventional form, indicated at 13, 14 and 15.

The mounting comprises a fitting 16 formed to provide a longitudinally extending chamber 17 opening through a connector flange 18 adapted to be suitably engaged with the flange 11' to place the chamber into open communication with the interior of the section 11 in which water pressure is maintained. Three branches, angularly related, and radiating from the axis of the chamber 17, open from said chamber, the median branch 19 preferably having its axis vertically arranged, and the two lateral branches 20 and 21 symmetrically diverging oppositely from the branch 19.

A companion fitting 22 is formed with a chamber similar to the chamber 17 opening through the flange 23 adapted to be clamped to the flange 12' of the section 12 leading to a point of use; and branches 24, 25 and 26, correspond, respectively, to branches 19, 20 and 21 previously described, the fittings 16 and 22 being allochirally arranged.

An extension 27 on the fitting 16 defines a cylindrical socket internally threaded as at 28; and the fitting 22 is provided with a similar flange 29 defining a similar socket. A bar or tube 30 is threaded at its opposite ends, as at 31 and 32, for threaded engagement in the sockets of the fittings 16 and 22, respectively. Preferably, the threading in the sockets of the respective fittings will be of opposite hand, as will be the threadings 31 and 32 at opposite ends of the bar 30, so that rotation of the bar 30 will draw the fittings 16 and 22 toward each other, or will force them apart. In some installations, the fitting 16 will be provided with a crescent-shaped base 33, and a similar base 34 will be provided for the fitting 22, said bases being secured to their fittings by machine screws 35, or the like. When such bases are provided, it will be apparent that the fittings may be most readily adjusted toward and away from each other by rotation of the bar 30 in one direction or the other.

Conduit means 36 has its lower end 37 suitably secured in communication with the branch 19 of the fitting 16; and, at its upper end, is provided with connector means 38 whose axis is substantially parallel with that of the chamber 17, for supporting engagement with the inlet spud 39 of a conventional meter 13. Preferably, a stop valve, indicated as a conventional angle cock 40, is interposed in the conduit means 36. Preferably, but not necessarily, the major portion of the conduit means 36 will comprise a copper tube, whose lower end is soldered or brazed in the branch 19; and whose upper end is flared into sealed relation with connector means associated with the valve 40.

Similar conduit means 41, comprising connector means 42 adapted supportingly to engage the outlet spud 43 of the meter 13, and a valve 44 similar to the valve 40, is associated similarly with the branch 24 of the fitting 22. It will be seen that, in this manner, the meter 13 is connected in the flow line between the pipe sections 11 and 12.

Conduit means 45 has one end associated with the branch 20 of the fitting 16, and is provided at its other end with connector means 46 adapted supportingly to engage the inlet spud 47 of a meter 14. A stop valve 48, similar to the valve 40, is installed in the conduit means 45; and a check valve fitting 50 has its inlet end supported in communication with the valve 48 by connector means 49; and directly carries, at its outlet end, the connector means 46. Details of the check valve fitting 50 will be described hereinafter.

Conduit means 51 has one end supported in the branch 25 of the fitting 22 and is provided at its opposite end with connector means 52 adapted supportingly to engage the outlet spud 53 of the meter 14, a stop valve 54 being disposed in the conduit means 51. Thus, the meter 14 is likewise connected in the flow line between the pipe sections 11 and 12, in parallel connection relative to the meter 13.

Similarly, conduit means 55 is associated with the branch 21 and terminates in a connector 56 whose axis is substantially parallel with that of the chamber 17, for supporting engagement with the inlet spud 57 of the meter 15. A stop valve 58 is disposed in the conduit means 55, and a check valve fitting 60 has its inlet end connected in communication with the valve 58 by connector means 59, and supports, at its outlet end, the connector means 56. Conduit means 61 has one end supported in the branch 26 and carries connector means 62 at its opposite end for supporting engagement with the outlet spud 63 of the meter 15, a stop valve 64 being disposed in the conduit means 61.

The arrangement is such that the axes of the connectors 38, 46 and 56 are all substantially parallel with that of the chamber 17 of the fitting 16, and the axes of the connectors 42, 52 and 62 are all substantially parallel with that of the chamber formed in the fitting 22; and that, when the sockets of the fittings 16 and 22 are axially aligned and the fittings 16 and 22 are properly oriented, as by means of the bases 33 and 34, the connectors 38 and 42 will be aligned, the connectors 46 and 52 will be aligned, and the connectors 56 and 62 will be aligned. Any incidental misalignment of these connector pairs is readily rectifiable through the inherent flexibility of the copper tubing preferably incorporated in the several conduit means.

The fitting 50 is shown in sectional detail in Fig. 4. Said fitting comprises a housing formed to provide a flow passage in which is interposed a valve seat 65. A spider 66 is arranged in advance of the valve seat, and a valve 67 is mounted for cooperative engagement with the seat 65. In the illustrated embodiment of the invention, the valve 67 is axially slidable upon a stem 68 which penetrates an opening 69 in the spider 66, the end of said stem being threaded as at 70 for the reception of a lock nut 71, and the opening 69 preferably being threaded. At its end remote from the spider 66, the stem 68 is provided with a head 72, between which and the valve 67 is confined a coiled spring 73 continuously urging the valve 67 into closing engagement with the seat 65, and resiliently resisting movement of said valve away from said seat under the influence of water pressure entering from the left as viewed in Fig. 4. The effective power of the spring 73 is, of course, adjustable; as, for instance, by threading the stem 68 more or less deeply into the opening 69 of the spider 66.

The unit 60 is in all respects comparable to the unit 50. In practice, the settings of the springs in the units 50 and 60 will differ by several pounds, so that one of said units will open to permit flow therethrough under predetermined demand conditions, while the other unit will not open except under higher demand conditions.

It will be noted that the conduit means 36 is not provided with a check valve unit.

With the installation complete, as suggested by the solid lines and dotted lines in Fig. 1, water will flow freely through the branch 19, conduit means 36, meter 13, conduit means 41, and branch 24, between the sections 11 and 12, whenever any flow demand exists; and, since the meter 13 is a relatively small-capacity meter, even water flows at very low rates will be accurately measured. When the flow demand approaches the capacity of the meter 13 for accurate measurement, the valve 67 in the unit 50 will be moved off its seat to permit a part of the flow required to satisfy that demand to pass, in parallel, through the branch 20, conduit means 45, meter 14, conduit means 51, and branch 25. If flow demand approaches the aggregate maximum capacity of the meters 13 and 14, the more heavily loaded valve of the unit 60 will open to permit a part of the water demanded to flow through the branch 21, conduit means 55, meter 15, conduit means 61, and branch 26.

When flow demand begins to drop from such a maximum, the valve in the fitting 60 will close as soon as the total flow volume comes within the capacity of the two meters 13 and 14; and the valve in the fitting 50 will close as soon as the total flow demand comes within the accurate capacity of a single meter 13. Thus, by the means herein illustrated and described, we have provided automatically acting means for accurately measuring flows at widely varying rates which could not be accurately measured by a single meter.

If any one of the meters requires removal for replacement or servicing, the stop valves, for instance 58 and 64, will be closed, the connectors 56 and 62 will be backed off the spuds 57 and 63, and the meter 15 can thereupon be removed from the installation, without in any way affecting the operation of the meters 13 and 14. When the meter 15 is reinstalled after servicing, or when a substitute meter is replaced, and the valves 58 and 64 are reopened, the installation will thereafter continue to function in the manner above described.

It will be seen that the copper tubes in the conduit means 45, 51, 55 and 61 are bent to provide offsets to accommodate the units 50 and 60. Obviously, a sufficient offset could, if desired, be provided in the conduit means 45 and 55, rendering offsetting of the conduit means 51 and 61 unnecessary; or vice versa. The particular angular relationship between the branches 20 and 21 and the branch 19 is believed to be optimum for the accommodation of conventional meters without interference, but other angular relationships may be adopted, if desired.

We claim as our invention:

1. A meter mounting comprising a pair of fittings, each formed at one end for connection in a fluid supply line and each provided with a plurality of angularly-related radiating branches, conduit means for each of said branches, each conduit means of each fitting being provided with connector means spacedly aligned with the connector means of the corresponding conduit means of the other fitting, each pair of aligned connector means being adapted to have the spuds of a meter connected to and supported thereby.

2. The meter mounting of claim 1 including check-valve means disposed in certain of said conduit means for controlling fluid flow therethrough.

3. The meter mounting of claim 2 including means resiliently resisting opening movement of said valves, the resisting means for each valve having a power different from the resisting means for each other valve.

4. The meter mounting of claim 3 including a stop valve disposed in each conduit means of one fitting.

5. The meter mounting of claim 1 including check valve means disposed in certain of said conduit means for controlling fluid flow therethrough, means resiliently resisting opening movement of said check valve means, the resisting means for each check valve means having a power different from the resisting means for each other check valve means, and a stop valve disposed in each of said conduit means.

6. The meter mounting of claim 1 including check-valve means disposed in certain of said conduit means for controlling fluid flow therethrough, and a stop valve disposed in each conduit means of one fitting.

7. The meter mounting of claim 6 including a stop valve disposed in each conduit means of the other fitting.

8. The meter mounting of claim 1 in which each fitting is provided with threaded means, said threaded means of said two fittings being aligned when said connector means are aligned, and means threadedly engaging both of said threaded means to control the relative positions of said fittings.

9. The meter mounting of claim 1 in which each fitting is provided with an internally threaded, blind socket, said sockets of said two fittings being aligned when said connector means are aligned, and a bar, threaded at its opposite ends, and threadedly engaged in both of said sockets to control the relative positions of said fittings.

10. The meter mounting of claim 9 in which the threads of said sockets are respectively of opposite hand, and the threads at opposite ends of said bar are similarly of opposite hand.

11. A fitting for use in a multiple meter mount comprising an element formed to provide a chamber opening through one end of said element, and formed, at said end, for connection to a fluid supply line, said element further being provided with a plurality of angularly-related branches radiating from said chamber, conduit means connected to each of said branches, each conduit means terminating in connector means whose axis is substantially parallel with that of said chamber, and flow-controlling means disposed in certain of said conduit means and acting to prevent fluid flow therepast at pressures below predetermined values, but to permit fluid flow therepast whenever pressures impressed thereon exceed such predetermined values.

12. The fitting of claim 11 in which each flow-controlling means responds to a pressure different from that to which each other flow-controlling means responds.

13. The fitting of claim 12 including a stop valve connected in each conduit means.

14. The fitting of claim 11 including a stop valve connected in each conduit means.

15. A fitting for use in a multiple meter mount comprising an element formed to provide a chamber opening through one end of said element, and formed, at said end, for connection to a fluid supply line, said element further being provided with three angularly-related branches radiating therefrom, a conduit connected to the median one of said branches and terminating in a connector means, a second conduit connected to one of the lateral branches and terminating in a connector means, a check valve disposed in said second conduit and capable of passage-opening movement toward said last-named connector means, spring means resisting such movement, a third conduit connected to the other lateral branch and terminating in a connector means, a check valve disposed in said third conduit and capable of passage-opening movement toward said last-named connector means, and further spring means resisting such movement, the resistant power of said further spring means exceeding that of said first-named spring means.

16. The fitting of claim 15 including a stop valve in each of said conduits.

17. The fitting of claim 16 in which the stop valves in said lateral conduits are located between said chamber and said respective check valves.

18. The mounting of claim 1 including a base for each of said fittings, each base having a substantial extent in the direction of length of its fitting and a substantial extent beyond each side of its fitting.

JOHN L. FORD.
WILBUR E. FORD.
RICHARD V. FORD.

REFERENCES CITED

The following references are of record in the file of this patent:

UNITED STATES PATENTS

| Number | Name | Date |
|---|---|---|
| Re. 23,091 | Ford | Mar. 15, 1949 |
| 155,280 | Ball | Sept. 22, 1874 |
| 866,952 | McKee | Sept. 24, 1907 |
| 1,308,569 | Wylie | July 1, 1919 |
| 1,561,436 | Smith | Nov. 10, 1925 |
| 2,018,615 | Lofton | Oct. 22, 1935 |